United States Patent

Kamiya

Patent Number: 5,313,555
Date of Patent: May 17, 1994

[54] LOMBARD VOICE RECOGNITION METHOD AND APPARATUS FOR RECOGNIZING VOICES IN NOISY CIRCUMSTANCE

[75] Inventor: Shin Kamiya, Nara, Japan

[73] Assignee: Sharp Kabushiki Kaisha, Osaka, Japan

[21] Appl. No.: 832,861

[22] Filed: Feb. 7, 1992

[30] Foreign Application Priority Data

Feb. 13, 1991 [JP] Japan .................. 3-19851

[51] Int. Cl.[5] .............................. G10L 9/04
[52] U.S. Cl. ................................. 395/2.42
[58] Field of Search .................. 381/41–46; 395/2.42

[56] References Cited

U.S. PATENT DOCUMENTS 4,282,403 8/1981 Sakoe ........................... 395/2
4,737,976 4/1988 Borth et al. .................. 381/46
5,001,761 3/1991 Hattori .......................... 381/46

FOREIGN PATENT DOCUMENTS 2188763 10/1987 United Kingdom .

OTHER PUBLICATIONS

Yumi Takizawa and Masahiro Hamada, "Lombard Speech Recognition by Formant-Frequency-Shifted LPC.Cepstrum", pp. 293-296, Nov., 18, 1990.

Primary Examiner—Michael R. Fleming
Assistant Examiner—Michelle Doerrler
Attorney, Agent, or Firm—David G. Conlin; Donald Brown

[57] ABSTRACT

A Lombard voice recognition method for recognizing a voice input in a noisy background includes a step of matching and a step of warping. The step of matching matches a frequency spectrum of a feature pattern derived from the input voice to a frequency spectrum of a standard pattern. The step of warping warps a lower frequency spectrum of the feature pattern than a lower frequency side with respect to a frequency axis in case that a noise level of the background in higher than a predetermined noise level.

18 Claims, 5 Drawing Sheets

Fig. 2

LOMBARD VOICE RECOGNITION METHOD AND APPARATUS FOR RECOGNIZING VOICES IN NOISY CIRCUMSTANCE

BACKGROUND OF THE INVENTION

1. Field of the Invention

The present invention relates to a Lombard voice recognizing method and apparatus for recognizing an input voice in a noisy background.

2. Description of the Related Art

The inventors of the present invention know a voice recognizing method which is capable of achieving a high recognition ratio of a voice input by a particular person even in a noisy background. The above-mentioned voice recognizing method utilizes a method for weighting a peak (formant) of a frequency spectrum derived from a voice waveform, the peak point keeping a relatively excellent sound to noise (S/N) ratio.

In the "Evaluating performance of an amending method by movement of formants against the transformation of a voice in a noisy background", reported by Takizawa and Hamada, Proceedings of Japan Acoustic Society, 1-8-9 (September, 1990), it is reported that the transformation of voice in a noisy background (Lombard effect) adversely effects on the voice recognition ratio. This report says that in a noisy background the formants located in a lower region than 1.5 KHz is forced to be shifted toward a higher frequency region by 120 Hz on an average whatever phoneme the input voice has. Hence, the foregoing voice recognizing method known by the present inventors may degrade its essential effect because of the shift of the formants in the noisy background.

The above-mentioned report by Takizawa, et. al. states that a cepstrum coefficient used in a linear predictive coding (LPC) method is amended by using an amending formula (1) in a noisy background. The amending formula (1) makes use of a presumed formant frequency and a band width of the presumed formant as shown below.

$$\widetilde{Cn} = Cn + \gamma n \quad (1)$$

where $\widetilde{Cn}$ denotes an amended cepstrum coefficient of the LPC, $Cn$ denotes an n-th degree cepstrum coefficient of the LPC about the transformed voice, and $\gamma n$ denotes amendment of $Cn$.

$$\gamma n = \sum_{i=1}^{M/2} \Delta f(\partial Cn/\partial fi)$$

wherein $\Delta f$ denotes a difference between a formant frequency of an actual voice and that of a transformed voice and $fi$ denotes the presumed frequency of the i-th formant about the transformed voice.

$$Cn = (2/n) \sum_{i=1}^{M/2} \exp(-n\pi bi/K) \cdot \cos(2\pi fin/K)$$

wherein $bi$ denotes a band width of the i-th formant and $K$ denotes a sampling frequency Hence, $$(\partial Cn/\partial fi) = (-4/K)\exp(-n\pi bi/K)\cdot\sin(2\pi fin/K)$$

As will be understood from the above, the foregoing voice recognition method reported by Takizawa, et. al. needs to presume the formant frequency fi. In the noisy background, however, it is difficult to presume the formant freqency fi from the waveform of the input voice.

Hence, an error takes place in the presumed formant frequency fi. Thereby, by using the reported voice recognition method, it is difficult to amend the cepstrum coefficient of the Linear Predictive Coefficient (LPC) accurately.

SUMMARY OF THE INVENTION

It is an object of the present invention to provide a Lombard voice recognition method which is capable of obtaining a high recognition ratio without having to presume a formant frequency, even if the formant is shifted in the waveform of the input voice in the noisy background.

The object of the present invention can be achieved by a a Lombard voice recognition method for recognizing a voice input in a noisy background includes a step of matching a frequency spectrum of a feature pattern derived from the input voice to a frequency spectrum of a standard pattern, and a step of warping a lower frequency spectrum of the feature pattern than a predetermined frequency by a predetermined warping width toward a lower frequency side with respect to a frequency axis in case that a noise level of the background is higher than a predetermined noise level.

Preferably, the predetermined warping width is changeable in accordance with a noise level of the input voice at a time when the lower frequency spectrum of the feature pattern than the predetermined frequency is warped by the predetermined warping width toward the lower frequency side with respect to the frequency axis.

More preferably, the matching uses a Dynamic Programming matching method which allows a range of a matching window to be changed.

Further preferably, the warping step including a process of calculating a total sum of distances along optimal paths.

The total sum calculating process preferably includes steps of setting a channel number i about a standard pattern A to 1, setting d(1, 1) to an initial value g(1, 1) of a partial sum g (i, j) of a distance along an optimal path, setting i+1 to a channel number j about a feature pattern B, setting a value K to constants k(1) and k(2), determining whether or not the channel number j about the feature pattern B is smaller than a value L0, determining whether or not the channel number j=1, resetting a content of the constant k(2) to 1, determining whether or not the channel number j=i+1, resetting a content of the constant k(1) to 1, carrying out calculations of a formula of $$g(i,j) = \min \begin{pmatrix} g(i, j-1) + k(1)d(i,j) \\ g(i-1, j-1) + 2\ d(i,j) \\ g(i-1, j) + k(2)d(i,j) \end{pmatrix}$$

for obtaining the partial sum g(i, j) of the distance along the optimal path, determining whether or not the channel number j about the feature pattern B is smaller than the value L0, determining whether or not the channel number $j \geq i+1$, incrementing the content of the channel number j about the feature pattern B, determining whether or not the channel number i≧L, incrementing a content of the channel number i about the standard pattern A, setting the channel number i to the channel number j about the feature pattern B, and calculating a total sum G of distances by using a formula of G=g(L, L)/2L.

The process of calculating a total sum of distances along optimal paths preferably includes steps of setting 1 to a channel number i about a standard pattern A, setting d(1, 1) to an initial value g(1, 1) of a partial sum g(i, j) of distances along optimal paths of the standard pattern A and a feature pattern B, setting i+1 to a channel number j about the feature pattern B, setting a value K to constants k(1) and k(2), determining whether or not a noise level is lower than 80 dB, determining whether or not a channel number j about the feature pattern B is smaller than a value M0, determining whether or not the channel number j=i, resetting a content of the constant k(2) to 1, determining whether or not the channel number j=i+1, resetting a content of the constant k(1) to 1, determining whether or not the channel number j about the feature pattern B is smaller than the value M0, determining whether or not the channel number j=i, resetting the content of the constant k(2) to 1, determining whether or not the channel number j=i+1, resetting the contents of the constants k(1) and k(2) to 1, determining whether or not the channel number j=i+2, resetting the content of the constant k(1) to 1, executing a calculation of a formula $$g(i, j) = \min \begin{pmatrix} g(i, j-1) + k(1)d(i, j) \\ g(i-1, j-1) + 2\, d(i, j) \\ g(i-1, j) + k(2)d(i, j) \end{pmatrix}$$

for obtaining the partial sum g(i, j) of the distances, determining whether or not the channel number j≧i+2, incrementing a content of the channel number j about the feature pattern B, determining whether or not the channel number i≧M, incrementing a content of the channel number i about the standard pattern A, setting i to the channel number j about the feature pattern B, and calculating a total sum G of distances by using a formula G=g (M, M)/2M.

The Lombard voice recognition method according to the first aspect of the invention includes the step of warping a lower frequency spectrum of the frequency spectrum standing for a feature pattern than the predetermined frequency toward a lower frequency side by a predetermined width before matching the standard pattern to the feature pattern. This warping is performed with respect to the frequency axis. This step makes it possible to normalize the transformation of an input voice sounded in a noisy background.

It is, therefore, unnecessary to presume the format frequency. If the location of the formant is shifted in the waveform of the input voice sounded in the noisy background, this method enables to offer a high recognition rate.

The Lombard voice recognition method further includes the step of changing the amount of the warping width depending on the noise level of the input voice when the warping is done with respect to the frequency axis. If, therefore, the noise level of the input voice is low, the warping width is allowed to become smaller for achieving more efficient matching of the frequency spectrum of the standard pattern to that of the feature pattern. If, on the other hand, the noise level of the input voice is high, the warping width is allowed to become larger for achieving more accurate matching.

It is another object of the present invention to provide a Lombard voice recognition apparatus The another object of the present invention can be achieved by a Lombard voice recognition apparatus which is capable of recognizing a voice input in a noisy background, the apparatus having a control unit for controlling the apparatus in proper manner, includes a unit connected to the control unit for extracting a power spectrum from a voice of a particular speaker, a unit connected to the extracting unit for cutting the power spectrum at proper syllabic intervals and for outputting the resulting feature pattern, a unit connected to the cutting unit for calculating similarity between the feature pattern and a standard pattern, a unit connected to the extracting unit for detecting a noise level of the noisy background, a unit connected to the detecting unit for warping the power spectrum located in a lower frequency region than a predetermined value toward a lower frequency side, and a unit connected to the similarity calculating unit for storing the standard pattern.

Preferably, the extracting unit is a feature extracting unit which is capable of receiving a voice waveform of a particular speaker.

More preferably, the feature extracting unit is composed of L channel filter banks, and the voice waveforms analyzed by the L channel filter banks being sampled at each 10 milliseconds.

A number of L of the L channel filter banks is preferably set as L ≧20.

Further preferably, the L channel filter banks are capable of obtaining a sum of squares with respect to output values of each frame from L channels of the L channel filter banks for normalizing an analyzed voice waveform.

The L channel filter banks are further capable of outputting serial outputs composed of normalized values from the L channels, the serial outputs being referred to as a power spectrum and the resulting power spectrum being input as feature parameters to the extracting unit, preferably.

The cutting unit is preferably a syllable interval extracting unit which is capable of cutting a power spectrum at syllable intervals on a basis of the feature parameters.

The similarity calculating unit is a similarity calculating unit which is capable of calculating similarity between a feature pattern at each syllable interval and a standard pattern registered in the standard pattern storing unit, preferably.

The similarity calculating unit is further capable of recognizing syllables on a basis of the calculated result and capable of outputting the recognized syllables, preferably.

The detecting unit is a noise detector for detecting a noise level of an input voice, so that a particular speaker in a noisy background is recognized in case that the detected noise level is higher than a predetermined value, preferably.

The apparatus is preferably capable of shifting formants located at a lower region than 1.5 KHz toward a higher side on a basis of a Lombard effect.

The warping unit is a frequency warping unit which is capable of warping lower frequency components of the feature pattern than 1.5 KHz toward a lower side, preferably.

Preferably, the frequency warping unit is operative for the feature pattern only.

The warping unit executes a warping with respect to the frequency axis, thereby making it possible to normalize the transformation of an input voice sounded in a noisy background.

It is, therefore, unnecessary to presume the formant frequency. If the location of the format is shifted in the waveform of the input voice sounded in the noisy background, this apparatus enables to offer a high recognition rate.

Further objects and advantages of the present invention will be apparent from the following description of the preferred embodiments of the invention as illustrated in the accompanying drawings.

BRIEF DESCRIPTION OF THE DRAWINGS

FIG. 2 is a graph showing a matching condition between a standard pattern and a feature pattern with respect to a frequency axis;

DESCRIPTION OF THE PREFERRED EMBODIMENTS

Referring to the accompanying drawings, an embodiment of the Lombard voice recognition method and apparatus according to the present invention will be described in details.

Figure 1:
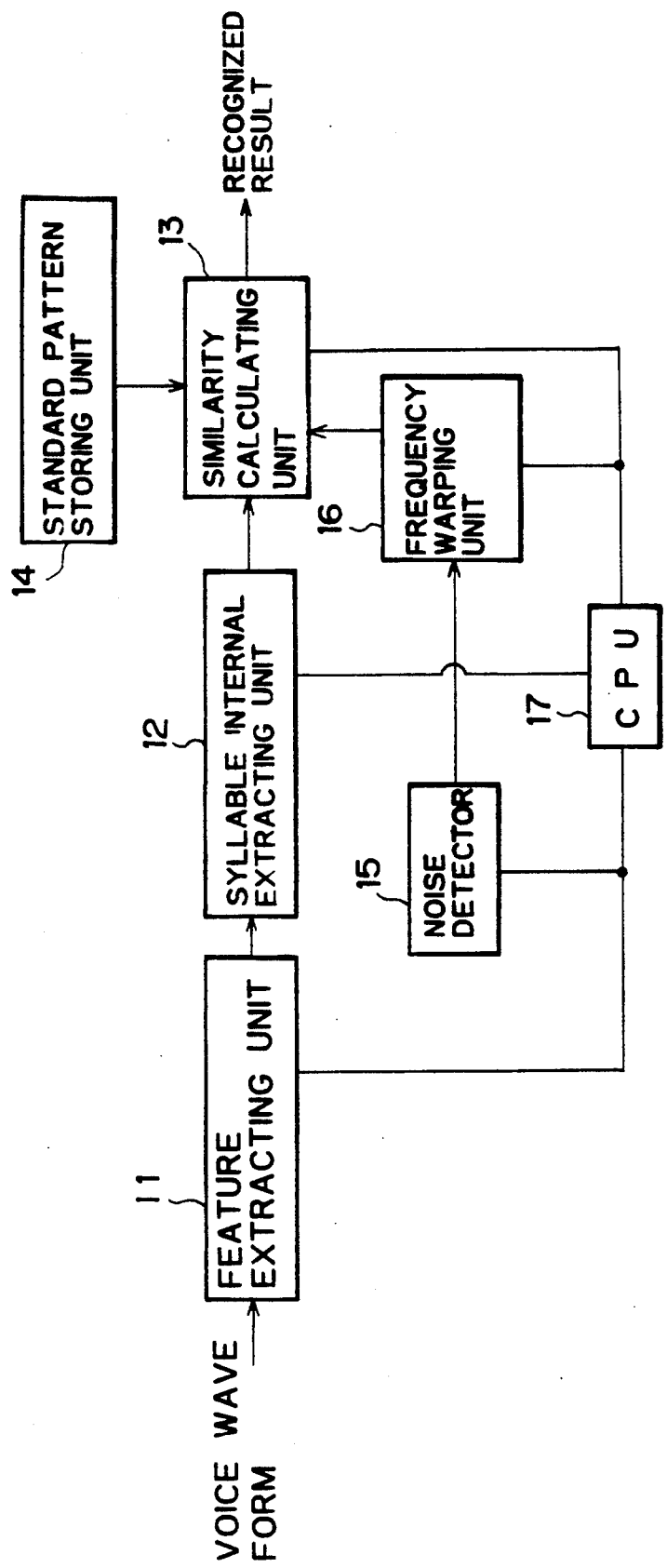
FIG. 1 is a block diagram showing a voice recognition apparatus according to an embodiment of the present invention.

FIG. 1 is a block diagram showing a voice recognition apparatus to which a Lombard voice recognition method according to an embodiment of the invention is applied.

As shown, the Lombard voice recognition apparatus includes a feature extracting unit 11 which receives a voice waveform of a particular speaker. The voice waveform has been input from a microphone (not shown) and amplified in an amplifier (not shown) before it reaches the feature extracting unit 11. The feature extracting unit 11 is composed of L channel (L≧20) filter banks. The voice waveforms analyzed by the filter banks are sampled at each 10 milliseconds (frame). Then, a sum of squares is obtained with respect to the output values of each frame from the L channels for the purpose of normalizing the analyzed voice waveform. The serial outputs composed of the normalized values from the L channels is referred to as a power spectrum. The resulting power spectrum is input as feature parameters to a syllable interval extracting unit 12. The syllable interval extracting unit 12 serves to cut the power spectrum at the syllable intervals on the basis of the feature parameters. The power spectrum cut at the syllable intervals is input to a similarity calculating unit 13 as a feature pattern.

The similarity calculating unit 13 operates to calculate similarity between the feature pattern at each syllable interval and a standard pattern registered in a standard pattern storing unit 14. The similarity calculating unit 13 recognizes the syllable based on the calculated result and outputs the recognized syllables.

A noise detector 15 is for detecting a noise level of the input voice. If the noise level detected by the noise detector 15 is higher than a predetermined value, it is recognized that the particular speaker is in a noisy background. Hence, the Lombard effect causes the formants located at a lower region than 1.5 KHz to be shifted toward the higher side.

In order to compensate for the shift, a frequency warping unit 16 is used. The frequency warping unit 16 serves to warp the lower frequency components of the feature pattern than 1.5 KHz toward the lower side. Since the standard pattern is normally created in a quite place, the frequency warping unit 16 is operative for the feature pattern only.

A CPU 17 serves to control the feature extracting unit 11, the syllable interval extracting unit 12, the similarity calculating unit 13, the noise detector 15 and the frequency warping unit 16. That is, the CPU 17 commands the syllable recognizing process.

In turn, the description will be directed to the operation of the similarity calculating unit 13.

In this embodiment, the similarity calculating unit 13 uses the Dynamic Programming (DP) matching method, which allows the range of a matching window to be changed.

Herein, assume that the feature pattern of a syllable input from the syllable interval extracting unit 12 is a feature pattern B and the standard pattern read from the standard pattern storing unit 14 is a standard pattern A.

The standard pattern A has element values standing for an output value of each channel and the feature pattern B has element values standing for an output value of each channel.

Assume that the element value of the standard pattern A is denoted as ai (1≧i) and the element value of the feature pattern B is denoted as bj (j≧L).

Figure 2:
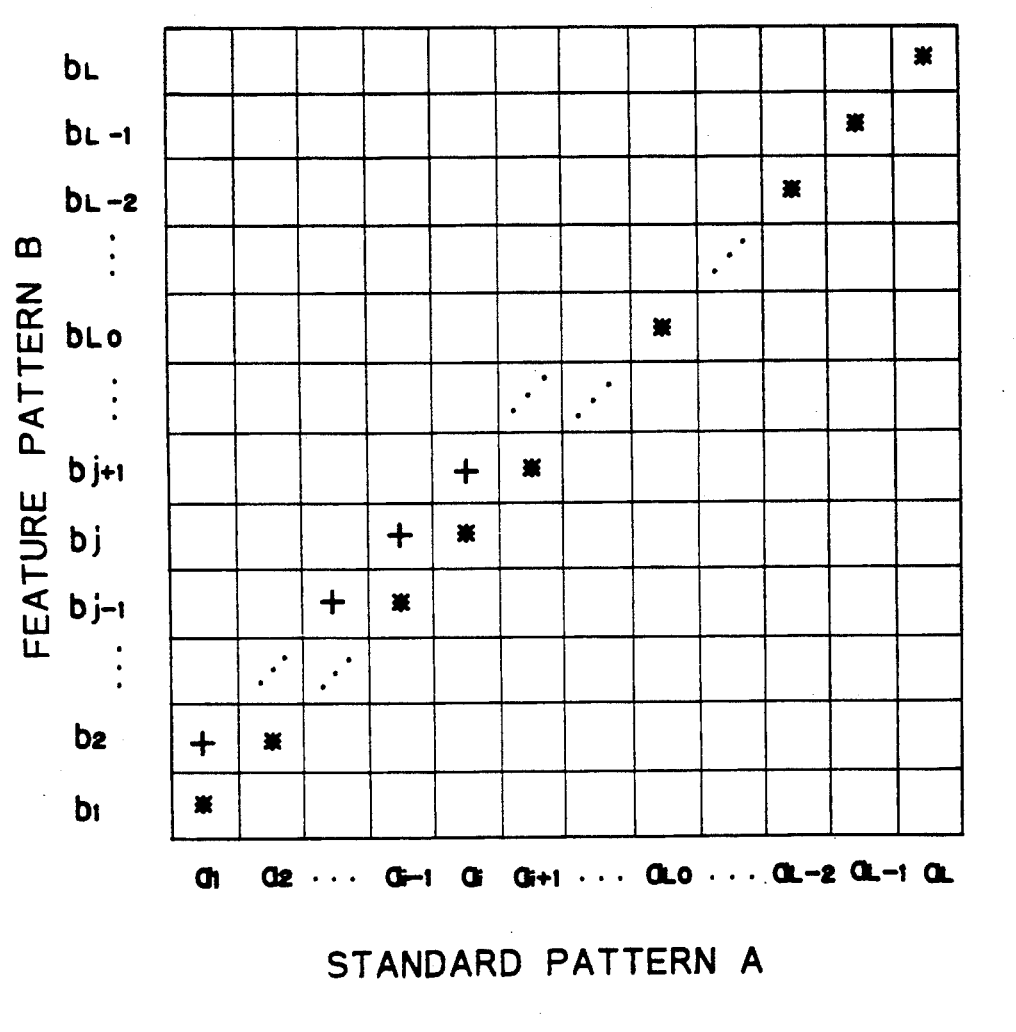

Now, consider the plane formed with the standard pattern A and the feature pattern B being located on the corresponding side as shown in FIG. 2.

The matching between the frequencies of both patterns (power spectrums) A and B is represented by the path of the lattice point (i, j) on the plane. The total sum G of each optimal path between the lattice points can be obtained by repetitively calculating a partial sum g(i, j) as increasing the channel numbers i and j. The partial sum g(i, j) is shown as below.

$$g(i, j) = \min \begin{pmatrix} g(i, j - 1) + k(1)d(i, j) \\ g(i - 1, j - 1) + 2\, d(i, j) \\ g(i - 1, j) + k(2)d(i, j) \end{pmatrix} \quad (2)$$

$$G = g(L, L)/2L$$

wherein d(i, j)=|ai−bj| and k(1) and k(2) are constants.

In case that the constants k(1) and k(2) are set to "1", the DP matching done according to the formula (2) is made equivalent to the normal DP matching. In case that they are set to a value far larger than "1", the partial sum g(i, j) of the distance of the optimal path is:

$$g(i, j) = g(i-1, j-1) + 2\, d(i, j)$$

Hence, the DP matching done according to the formula (2) becomes equivalent to the linear matching.

Herein, assume that the channel number i, j corresponding to 1.5 KHz is "L0".

When calculating the similarity, the constants k(1) and k(2) in the formula (2) are set to a far larger value than "1" for carrying out the linear matching. If the noise level of the input voice detected by the noise detector 15 is larger than a predetermined value, the Lombard effect causes the formants of the feature pattern B located at a lower region than 1.5 KHz to be shifted toward a higher region. Hence, it is necessary to warp to the lower frequency side the element values of the feature pattern B located in a lower frequency region than the L0 channel.

The warping amount of the feature pattern B is set as a large value enough to normalize the shifted formants. In the case of using a filter bank composed of 20 to 40 channels, the element values are warped toward the lower frequency side by the amount corresponding to one channel. It means that each of the element values located in a lower frequency region than the element value bL0 is matched to the element value located in a lower frequency region than the actually corresponding element value of the standard pattern A by the amount corresponding to one channel.

In this embodiment, therefore, in the case of $j < L0$, the element value bj is matched to the element value ai or ai−1.

in the case of $j \geq L0$, the element value bj is matched to the element value ai.

As a result, the matching between the element value of the standard pattern A and that of the feature pattern B is represented as a chain of symbols "*" or "+" as shown in FIG. 2.

The expansion or shrinkage of the frequency axis can be realized by setting the constants k(1) and k(2) in the formula (2) as follows.

If $j < L$ and $j = 1$, $k(1) = K$, $k(2) = 1$

If $j < L0$ and $j = i+1$, $k(1) = 1$, $k(2) = K$

In any other case, $k(1) = K$, $k(2) = K$ wherein $K \gg 1$

In other words, in this embodiment, the similarity is calculated by the linear matching if $j \geq L0$, while it is calculated by the DP matching in the range of the matching window $(j-i) \leq 1$ if $j < L0$.

As will be understood from the above description, the frequency warping unit 16 serves to set the values of the constants k(1) and k(2) in the formula (2) based on the detected result of the noise detector 15 and the content of the channel number i, j.

Figure 3:
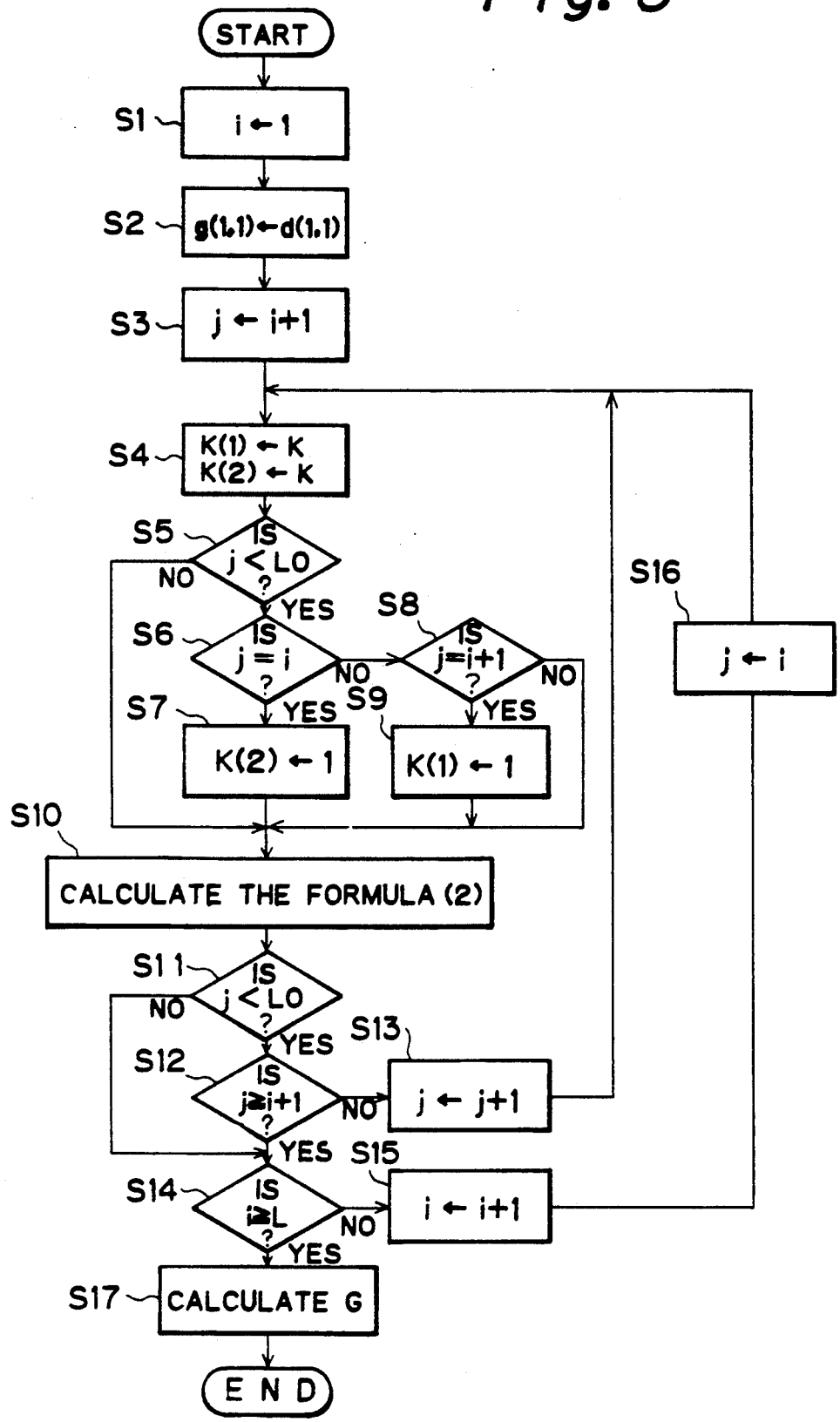
FIG. 3 is a flowchart showing a process for calculating a total sum of the distances along the optimal paths.

FIG. 3 is a flowchart showing the calculation of the total sum of the optimal paths, which is carried out in the similarity calculating unit 13 under the control of the CPU 17.

In turn, the description will be directed to the calculation of the total sum of the optimal paths.

At a step S1, the channel number i about the standard pattern A is set to "1". At a step S2, "d(1, 1)" is set to the initial value g(1, 1) of the partial sum g (i, j) of the distance along the optimal path. At a step S3, "i+1" is set to the channel number j about the feature pattern B. At a step S4, the value "K" is set to the constants k (1) and k (2). At a step S5, it is determined whether or not the channel number j about the feature pattern B is smaller than "L0". If yes, the process goes to a step S6. If not, the process goes to a step S10.

At a step S6, it is determined whether or not j=1. If yes, the process goes to a step S7. If not, the process goes to a step S8. At a step S7, the content of the constant k(2) is reset to "1". At a step S8, it is determined whether or not j=i+1. If yes, the process goes to a step S9. If not, the process skipped the step S9. At the step S9, the content of the constant k(1) is reset to "1". At the step S10, the calculation of the formula (2) is carried out for obtaining the partial sum g(i, j) of the distance along the optimal path.

At a step S11, it is determined whether or not the channel number j about the feature pattern B is smaller than "L0". If yes, the process goes to a step S12. If not, the process goes to a step S14. At the step S12, it is determined whether or not $j \geq i+1$. If yes, the process goes to a step S14 and, if not, to a step S13. At the step S13, the content of the channel number j about the feature pattern B is incremented. Then, the process returns to the step S4 at which the calculation of the next partial sum g (i, i+1) is started.

At the step S14, it is determined whether or not $i \geq L$. If yes, the process goes to a step S17. If not, the process goes to a step S15. At the step S15, the content of the channel number i about the standard pattern A is incremented and the process goes to a step S16. At the step S16, "i" is set to the channel number j about the feature pattern B. Then, the process returns to the step S4 at which the partial sum of the next element value ai+1 about the standard pattern A is calculated.

At a step S17, the total sum G of the distances is calculated by using the formula of:

$G = g(L, L)/2L$

Then, this is the end of the calculation of the total sum of the distances along the optimal paths.

According to the aforementioned process, it is possible to calculate the distance G standing for the similarity between the feature pattern B input by the particular speaker and the standard pattern A. The resulting distance G is obtained in the state of matching the element value bj to the element value ai or ai−1 if $j < L0$ as being denoted by the symbol "*" or "+" shown in FIG. 2. That is, for calculating the total distance G, the element values of the feature pattern B located in a lower region than 1.5 KHz is warped toward the lower region by the amount corresponding to one channel.

Hence, if $j < L0$, the DP matching is used in the range of the matching window $(j-i) \leq 1$. This matching window makes it possible to normalize the formants shifted by the noise.

As mentioned above, in this embodiment, if the similarity calculating unit 13 performs the matching about a voice input in a noisy background, the linear matching is selected for the element values of the feature pattern B whose channel numbers j correspond to the channel number L0 or more. The channel number L0 matches to 1.5 KHz.

On the other hand, for the element values of the feature pattern B whose channel numbers j correspond to a smaller number than L0, the DP matching is selected in the range of the large matching window enough to normalize the formants shifted by the noise.

As a result, the DP matching makes it possible to normalize the shifted formants of the feature pattern B. Hence, if the distance G calculated by the foregoing process is used in recognizing the syllable of the voice input by the particular speaker, it is possible to obtain a quite high recognition rate of the voice input in a noisy background without presuming the formant frequency.

According to this embodiment, as set forth above, "1" is set to the constant $k(1)$ or $k(2)$ of the formula (2) according to the content of the channel numbers i and j. The matching window for the DP matching is set to be in the range of $(j-i) \leq 1$.

However, the present invention is not limited to the above-described case. In essence, the matching window may use any range only if the formants shifted by the noise are allowed to be normalized. In the foregoing embodiment, the description is expanded on the assumption that the number L of the channels included in the filter banks is 20 to 40.

In the embodiment where the channel number L is 40 or more, the gap between the central frequencies of the channels is set to be narrower. This results in making it possible to change the matching of the element value bj of the feature pattern B to the element value ai of the standard pattern A depending on the noise level, that is, how much each element value is shifted toward the lower frequency side.

When the DP matching is carried out by the formula (2), it is possible to match the element values of the feature pattern B located in a lower frequency region than the element value bL0 to those of the standard pattern A located in a lower frequency region than the actually matched element values by the amount corresponding to one channel, if the noise level is lower than 80 dB.

On the other hand, if the noise level is 80 dB or higher, the element values of the feature pattern B may be matched to the element values of the standard pattern A in the lower frequency side than the actually matched element values by the amount corresponding to one or two channels.

In this embodiment, therefore, assuming that the channel for 1.5 KHz is M0 and the number of the channels is M, in the case of $j \geq M0$, the element value bj is matched to the element value ai, in the case of $j < M0$, if the noise level is lower than 80 dB, the element value bj is matched to the element value ai or the element value ai−1, if the noise level is 80 dB or higher, the element value bj is matched to the element value ai, ai−1 or ai−2.

This kind of expansion or shrinkage of the frequency axis is implemented by setting the constants $k(1)$ and $k(2)$ of the formula (2) as follows.

Figure 4:
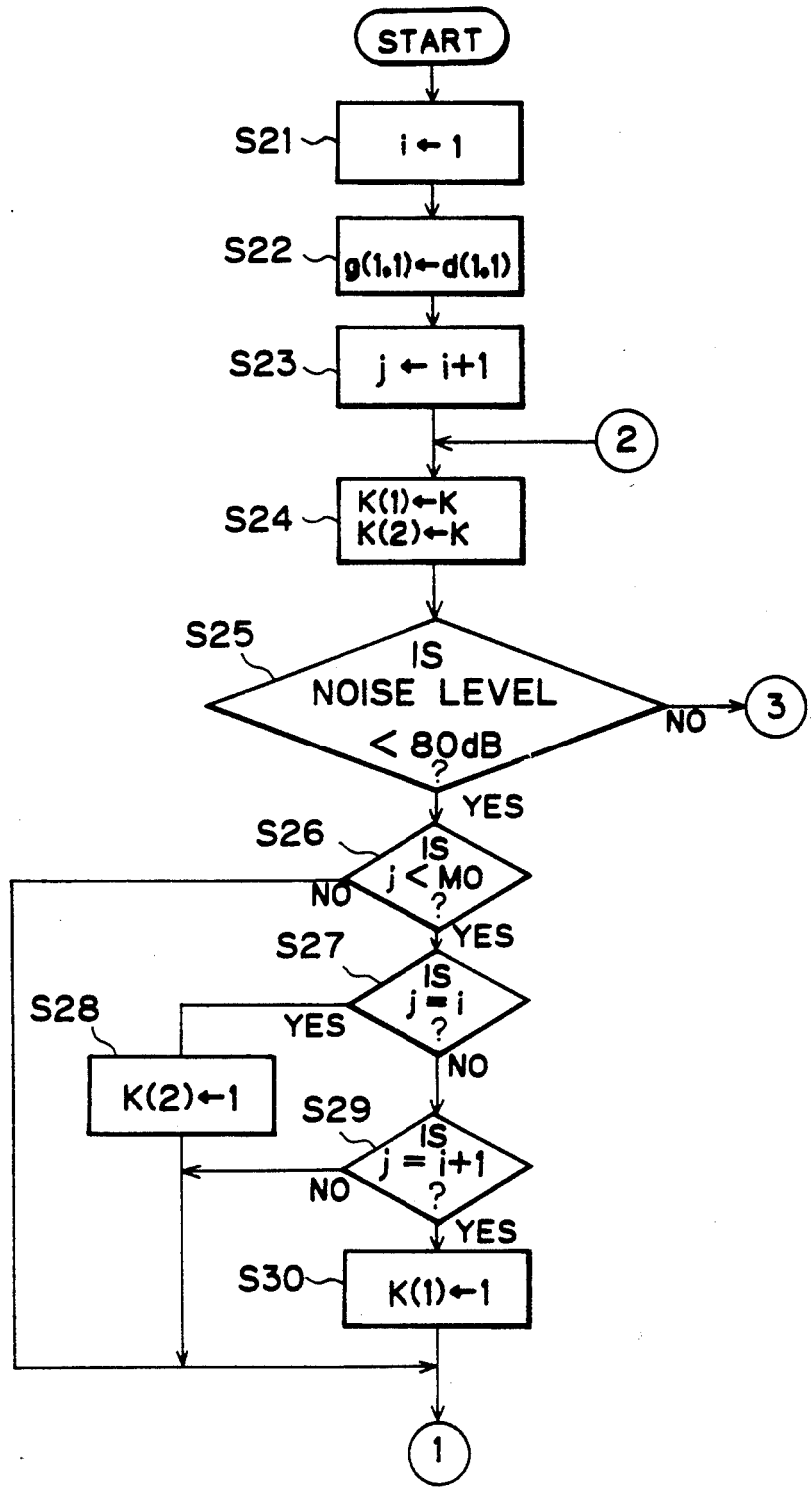
FIG. 4 is a flowchart showing another process for calculating a total sum of the distances along the optimal paths.
Figure 5:
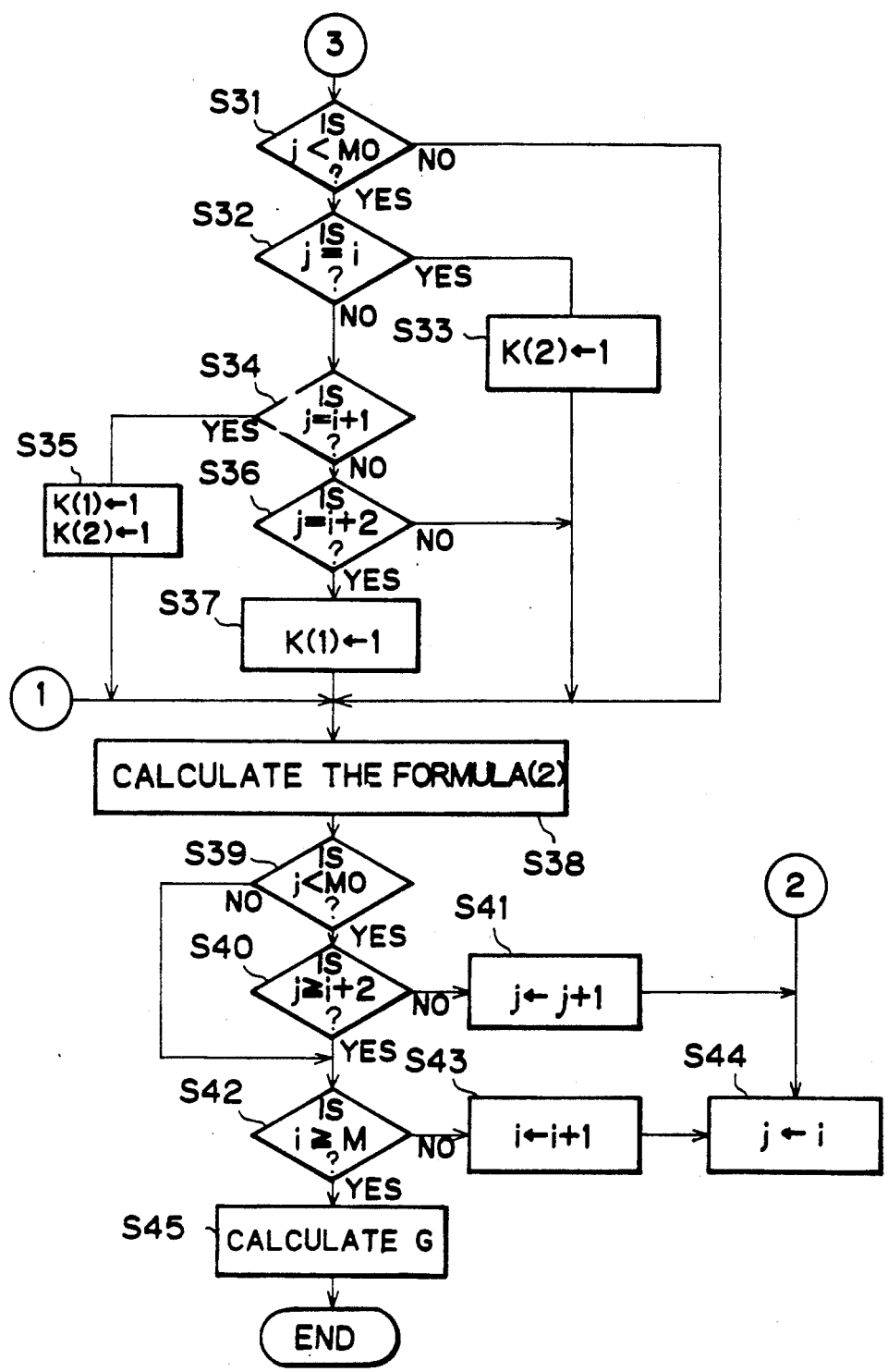
FIG. 5 is a flowchart showing a process for calculating a total sum of the distances along the optimal paths following the process shown in FIG. 4.

(a) In the case of noise level < 80 dB, if $j < M0$ and $j=1$, $k(1)=K$ and $k(2)=1$ if $j < M0$ and $j=i+1$, $k(1)=1$ and $k(2)=K$ in any other case, $k(1)=K$ and $k(2)=K$ wherein $k >> 1$ (b) In the case of noise level ≥ 80 dB if $j < M0$ and $j=1$, $k(1)=K$ and $k(2)=1$ if $j < M0$ and $j=i+1$, $k(1)=1$ and $k(2)=1$ if $j < M0$ and $j=i+2$, $k(1)=1$ and $k(2)=K$ in any other case, $k(1)=K$ and $k(2)=K$ wherein $k >> 1$ FIG. 4 is a flowchart showing the calculation of the total sum of the distances along the optimal paths according to this embodiment.

The description will be directed to the calculation of the total sum of the distances along the optimal paths in the case that the number M of the channels in the filter bank is 40 or more.

At a step S21, "1" is set to the channel number i about the standard pattern A. At a step S22, "d(1, 1)" is set to the initial value g(1, 1) of the partial sum g(i, j) of the distances along the optical paths of the standard pattern A and the feature pattern B. At a step S23, "i+1" is set to the channel number j about the feature pattern B. At a step S24, the value "K" is set to the constants $k(1)$ and $k(2)$. At a step S25, it is determined whether or not the noise level is lower than 80 dB. If yes, the process goes to a step S26 and, if not, to a step S31.

At the step S26, since the noise level is lower than 80 dB, the process enters into the operation for matching the element value bj to the element value bi or ai−1. It means that at this step it is determined whether or not the channel number j about the feature pattern B is smaller than "M0". If yes, the process goes to a step S27 and, if not, to a step S38.

At a step S27, it is determined whether or not j=i. If yes, the process goes to a step S28 and, if not, to a step S29. At the step S28, the content of the constant k(2) set at the step S24 is reset "1" and then the process goes to the step S38. At the step S29, it is determined whether or not j=i+1. If yes, the process goes to a step S30 and, if not, to the step S38.

At a step S30, the content of the constant k(1) set at the step S24 is reset to "1" and then the process goes to the step S38. At the step S31, since the noise level is 80 dB or higher as mentioned above, the process enters into the operation for matching the element value bj to the element value ai, ai−1 or ai−2. It means that at this step it is determined whether or not the channel number j about the feature pattern B is smaller than "M0". If yes, the process goes to a step S31 and, if not, to the step S38.

At a step S32, it is determined whether or not j=i. If yes, the process goes to a step S33. If not, the process goes to a step S34. At the step S33, the content of the constant k(2) set at the step S24 is reset to "1" and then the process goes to the step S38. At the step S34, it is determined whether or not j=i+1. If yes, the process goes to a step S35 and, if not, to the step S38.

At the step S35, the contents of the constants k(1) and k(2) set at the step S24 are reset to "1" and then the process goes to the step S38. At the step S36, it is determined whether or not j=i+2. If yes, the process goes to a step S37 and, if not, to the step S38. At the step S37, the content of the constant k(1) set at the step S24 is reset to "1".

At the step S38, the calculation of the formula (2) is executed for obtaining the partial sum g(i, j) of the distances. At the step S39, it is determined whether or not j ≥ i+2. If yes, the process goes to a step S42 and, if not, to a step S41. At the step S41, the content of the channel number j about the feature pattern B is incremented. Then, returning to the step S24, the calculation of the partial sum g(i, j+1) is started.

At a step S42, it is determined whether or not i ≥ M. If yes, the process goes to a step S45 and, if not, to a step S43. At the step S43, the content of the channel number i about the standard pattern A is incremented and then the process goes to a step S44. At the step S44, "i" is set to the channel number j about the feature pattern B. Then, returning to the step S24, the process enters into the operation for calculating the partial sum about the next element value ai+1 of the standard pattern A.

At the step S45, the total sum G of the distances is calculated on the basis of the following formula:

$$G = g(M, M)/2M$$

Then, the calculating operation of the total sum is terminated.

The execution of the aforementioned process results in calculating the total distance G standing for the similarity between the input feature pattern B and the standard pattern A read from the standard pattern storing unit 14. The resulting distance G is given if the noise level is lower than 80 dB. If j≧M0, the distance G is calculated in the state where the element value bj is matched to the element value ai or ai−1. That is, the element values of the feature pattern B located in the lower region than 1.5 KHz are warped toward the lower frequency side by the amount corresponding to one channel. If the noise level is 80 dB or more and j<M0, the calculation is executed in the state that the element value bj is matched to the element value ai, ai−1 or ai−2. That is, the element values of the feature pattern B located in a lower region than 1.5 KHz are warped toward the lower frequency side by the amount corresponding to two channels.

This warping means that the DP matching is carried out in the range of the matching window of (j−i)≦2 if the noise level is 80 dB or more and j≦M0. The matching window serves to normalize the formants shifted by the noise.

As set forth above, in this embodiment, if the voice is input in the noisy background of 80 dB or more, the linear matching is selected for the element values of the feature pattern B whose channel numbers j correspond to the channel number L0 or more. The channel number L0 matches to 1.5 KHz.

On the other hand, for the element values of the feature pattern B whose channel numbers j correspond to a smaller number than L0, the DP matching is selected in the range of the large matching window enough to normalize the formants shifted by the noise.

As a result, the DP matching makes it possible to normalize the shifted formants of the feature pattern B. Hence, if the distance G calculated by the foregoing process is used in recognizing the syllable of the voice input by the particular speaker, it is possible to obtain a quite high recognition rate of the voice input in a noisy background without presuming the formant frequency.

If the channel number j of the feature pattern B is smaller than M0, depending on the noise level, that is, how much the formants of the feature pattern B located at a 1.5 KHz or lower range are shifted toward the higher frequency side, the range of the matching window is changed as follows.

noise level <80 dB . . . j−i≦1 noise level ≧80 dB . . . j−i≦2

As a result, if the noise level is lower than 80 dB and the shifting level of the formants is low, it is possible to reduce the amount of calculation when calculating the total sum G of the distances along the optimal paths for the purpose of calculating the similarity more efficiently. If, on the other hand, the noise level is 80 dB or more, the matching window is allowed to be wide enough to normalize the shifted formants.

It will be understood from the above description that this embodiment makes it possible to recognize the voice input by a particular speaker in the noisy background at a high recognition ratio and quite efficiently.

In the above description, the range of the matching window for the DP matching is switched from (j−i)≦1 to (j−i)≦2 or vice versa on the border of the noise level of 80 dB. However, the present invention does not limit the border of the noise level and the range of the matching range to those values.

Many widely different embodiments of the present invention may be constructed without departing from the spirit and scope of the present invention. It should be understood that the present invention is not limited to the specific embodiments described in the specification, except as defined in the appended claims.

What is claimed is:

1. A Lombard voice recognition method for recognizing an input voice under a noisy background comprising the steps of:

warping a frequency spectrum of a lower frequency than a predetermined frequency in a frequency spectrum of a feature pattern with a predetermined warping width toward a lower frequency side in a frequency axis, said warping being at a time when a noisy level of an input voice is higher than a predetermined noisy level, said frequency spectrum of said feature pattern being derived from said input voice; and matching a frequency spectrum of a standard pattern with said warped frequency spectrum of said feature pattern to calculate similarity between said standard pattern and said feature pattern and outputting a recognized result based on the calculated similarity, said predetermined warping width being changeable in accordance with a nose level of said input voice at a time when said lower frequency spectrum of said feature pattern than said predetermined frequency is warped by said predetermined warping width toward said lower frequency side with respect to said frequency axis.

2. A Lombard voice recognition method according to claim 1, wherein said matching uses a Dynamic Programming matching method which allows a range of a matching window to be changed.

3. A Lombard voice recognition method according to claim 2, wherein said process of calculating a total sum of distances along optimal paths includes steps of setting 1 to a channel number i about a standard pattern A, setting d(1, 1) to an initial value g(1, 1) of a partial sum g(i, j) of distances along optimal paths of said standard pattern A and a feature pattern B, setting i+1 to a channel number j about said feature pattern B, setting a value K to constants k(1) and k(2); determining whether or not a noise level is lower than 80 dB, determining whether or not a channel number j about said feature pattern B is smaller than a value M0, determining whether or not said channel number j=i, resetting a content of said constant k(2) to 1, determining whether or not said channel number j=i+1, resetting a content of said constant k(1) to 1, determining whether or not said channel number j about said feature pattern B is smaller than said value M0, determining whether or not said channel number j=i, resetting said content of said constant k(2) to 1, determining whether or not said channel number j=i+1, resetting said contents of said constants k(1) and k(2) to 1, determining whether or not said channel number j=i+2, resetting said content of said constant k(1) to 1, executing a calculation of a formula $$g(i,j) = \min \begin{pmatrix} g(i,j-1) + k(1)d(i,j) \\ g(i-1,j-1) + 2\,d(i,j) \\ g(i-1,j) + k(2)d(i,j) \end{pmatrix}$$

for obtaining said partial sum g(i, j) of said distances, determining whether or not said channel number j≧i+2, incrementing a content of said channel number j about said feature pattern B, determining whether or not said channel number i≧M, incrementing a content of said channel number i about said standard pattern A, setting i to said channel number j about said feature pattern B, and calculating a total sum G of distances by using a formula G=g(M, M)/2M.

4. A Lombard voice recognition method according to claim 1, wherein said warping step includes a process of calculating a total sum of distances along optimal paths.

5. A Lombard voice recognition method according to claim 4, wherein said total sum calculating process includes steps of setting a channel number i about a standard pattern A to 1, setting d(1, 1) to an initial value g(1, 1) of a partial sum g (i, j) of a distance along an optimal path, setting i+1 to a channel number j about a feature pattern B, setting a value K to constants k(1) and k(2), determining whether or not said channel number j about said feature pattern B is smaller than a value L0, determining whether or not said channel number j=1, resetting the content of the constant k(2) to 1, determining whether or not said channel number j=i+1, resetting the content of the constant k(1) to 1, carrying out calculations of a formula of $$g(i,j) = \min \begin{pmatrix} g(i,j-1) + k(1)d(i,j) \\ g(i-1,j-1) + 2\,d(i,j) \\ g(i-1,j) + k(2)d(i,j) \end{pmatrix}$$

for obtaining said partial sum g(i, j) of said distance along said optimal path, determining whether or not said channel number j about the feature pattern B is smaller than said value L0, determining whether or not said channel number j≧i+1, incrementing the content of said channel number j about said feature pattern B, determining whether or not said channel number i≧L, incrementing a content of said channel number i about said standard pattern A, setting said channel number i to said channel number j about said feature pattern B, and calculating a total sum G of distances by using a formula of G=g(L, L)/2L.

6. A Lombard voice recognition apparatus which is capable of recognizing a voice input in a noisy background, said apparatus having a control means for controlling said apparatus in a proper manner, said apparatus comprising:

means connected to said control means for extracting a power spectrum from a voice of a particular speaker;

means connected to said extracting means for cutting said power spectrum at proper syllabic intervals and for outputting a feature pattern;

means connected to said cutting means for calculating similarity between said feature pattern and a standard pattern, and for outputting recognized result based on the calculated similarity;

means connected to said extracting means for detecting a noise level of said noisy background;

means connected to said detecting means and said similarity calculating means for warping said power spectrum located in a lower frequency region than a predetermined value toward a lower frequency side; and means connected to said similarity calculating means for storing said standard pattern.

7. A Lombard voice recognition apparatus according to claim 6, wherein said extracting means is a feature extracting unit which is capable of receiving a voice waveform of a particular speaker.

8. A Lombard voice recognition apparatus according to claim 7, wherein said feature extracting unit is composed of L channel filter banks, and said voice waveforms analyzed by said L channel filter banks being sampled at 10 milliseconds.

9. A Lombard voice recognition apparatus according to claim 8, wherein a number of L of said L channel filter banks is set as L≧20.

10. A Lombard voice recognition apparatus according to claim 8, wherein said L channel filter banks are capable of obtaining a sum of squares with respect to output values of a frame from L channels of said L channel filter banks for normalizing an analyzed voice waveform.

11. A Lombard voice recognition apparatus according to claim 10, wherein said L channel filter banks are further capable of outputting serial outputs composed of normalized values from said L channels, said serial outputs being referred to as a power spectrum and said power spectrum being input as feature parameters to said extracting means.

12. A Lombard voice recognition apparatus according to claim 11, wherein said cutting means is a syllable interval extracting unit which is capable of cutting a power spectrum at syllable intervals on a basis of said feature parameters.

13. A Lombard voice recognition apparatus according to claim 6, wherein said similarity calculating means is a similarity calculating unit which is capable of calculating similarity between a feature pattern at each syllable interval and a standard pattern registered in said standard pattern storing means.

14. A Lombard voice recognition apparatus according to claim 13, wherein said similarity calculating unit is further capable of recognizing syllables on a basis of said calculated result and is capable of outputting a syllable recognized by said similarity calculating unit.

15. A Lombard voice recognition apparatus according to claim 6, wherein said detecting means is a noise detector for detecting a noise level of an input voice, so that a particular speaker in a noisy background is recognized at a time when said detected noise level is higher than a predetermined value.

16. A Lombard voice recognition apparatus according to claim 15, wherein said apparatus is capable of shifting formants located at a lower region than 1.5 KHz toward a higher side on a basis of a Lombard effect.

17. A Lombard voice recognition apparatus according to claim 16, wherein said frequency warping unit is operative for said feature pattern only.

18. A Lombard voice recognition apparatus according to claim 6, wherein said warping means is a frequency warping unit which is capable of warping lower frequency components of said feature pattern than 1.5 KHz toward a lower side.

* * * * *